United States Patent [19]

Baumstark et al.

[11] Patent Number: 5,744,540
[45] Date of Patent: Apr. 28, 1998

[54] AQUEOUS POLYMER EMULSION

[75] Inventors: Roland Baumstark, Neustadt; Michael Portugall, Wachenheim; Rolf Dersch, Neustadt; Enrique Schweigger, Ludwigshafen, all of Germany

[73] Assignee: BASF Aktiengesellschaft, Ludwigshafen, Germany

[21] Appl. No.: 551,489

[22] Filed: Nov. 1, 1995

[51] Int. Cl.[6] .................................................. C08L 39/04
[52] U.S. Cl. ........................ 524/558; 524/460; 524/555; 524/559; 524/561
[58] Field of Search ............................. 524/558, 559, 524/561, 460, 555

[56] References Cited

U.S. PATENT DOCUMENTS

| | | | |
|---|---|---|---|
| 3,244,655 | 4/1966 | Sullivan et al. | 524/460 |
| 3,454,516 | 7/1969 | Victorius | 524/522 |
| 4,263,193 | 4/1981 | Sakimoto et al. | 524/533 |
| 4,654,397 | 3/1987 | Mueller-Mall | 524/460 |
| 4,994,537 | 2/1991 | Craig et al. | 526/273 |
| 5,021,469 | 6/1991 | Langerbeins et al. | 523/201 |
| 5,071,902 | 12/1991 | Langerbeins et al. | 524/458 |
| 5,130,367 | 7/1992 | Craig et al. | 524/819 |
| 5,185,387 | 2/1993 | Klesse et al. | 523/201 |
| 5,468,800 | 11/1995 | Folsch et al. | 524/458 |

FOREIGN PATENT DOCUMENTS

| | | |
|---|---|---|
| 0 184 091 | 6/1986 | European Pat. Off. . |
| 0 376 096 | 7/1990 | European Pat. Off. . |
| 0 379 892 | 8/1990 | European Pat. Off. . |
| 0 421 185 | 4/1991 | European Pat. Off. . |
| 0 429 207 | 5/1991 | European Pat. Off. . |
| 0 522 789 | 1/1993 | European Pat. Off. . |
| 0 609 756 | 8/1994 | European Pat. Off. . |
| 0 609 793 | 8/1994 | European Pat. Off. . |
| 0 623 659 | 11/1994 | European Pat. Off. . |
| 1 220 613 | 7/1966 | Germany . |
| 34 18 524 | 11/1985 | Germany . |
| 39 02 067 | 7/1990 | Germany . |
| 43 34 178 | 4/1995 | Germany . |
| WO 95/16720 | 6/1995 | WIPO . |

*Primary Examiner*—Vasu Jagannathan
*Assistant Examiner*—John J. Guarriello
*Attorney, Agent, or Firm*—Oblon, Spivak, McClelland, Maier & Neustadt, P.C.

[57] ABSTRACT

An aqueous polymer emulsion is obtained by polymerizing first a monomer composition 1 in a first polymerization stage and then a monomer composition 2 in a polymerization stage 2, in each case by the free radical aqueous emulsion polymerization method, one of the two monomer compositions essentially comprising hard monomers and the other monomer composition essentially comprising soft monomers, and, in addition to the monomer compositions 1 and 2, nitrogen-containing adhesion-promoting monomers being polymerized, at least 20 mol % of the total amount of the adhesion-promoting monomers being polymerized in polymerization stage 1.

46 Claims, No Drawings

AQUEOUS POLYMER EMULSION

FIELD AND SUMMARY OF THE INVENTION

The present invention relates to an aqueous polymer emulsion obtainable by polymerizing a composition 1 of compounds (monomers) having at least one ethylenically unsaturated group by the free radical aqueous emulsion polymerization method to a conversion of at least 90, preferably at least 95, particularly preferably at least 98%, by weight, based on the monomer composition 1 to be polymerized, (polymerization stage 1) and then polymerizing, in the presence of the product mixture of polymerization stage 1, a composition 2 of compounds (monomers) having at least one ethylenically unsaturated group by the free radical aqueous emulsion polymerization method (polymerization stage 2), with the proviso that a) the composition 1 is such that random copolymerization of the composition 1 alone would give a polymer 1 whose glass transition temperature tends to the limit $Tg^1$ with increasing molecular weight, b) the composition 2 is such that random copolymerization of the composition 2 alone would give a polymer 2 whose glass transition temperature tends to the limit $Tg^2$ with increasing molecular weight, c) the difference between $Tg^1$ and $Tg^2$ is at least 20° C., d) in addition to the monomers of the compositions 1 and 2, at least one adhesion-promoting monomer which differs from these monomers and contains at least one ethylenically unsaturated group and the element nitrogen is polymerized in an amount of from 0.1 to 10, frequently from 0.5 to 5, preferably from 1 to 3%, by weight, based on the total amount of the monomers to be polymerized, e) from 20 to 100 mol % of the total amount of the adhesion-promoting monomers to be polymerized according to d) are polymerized in polymerization stage 1 and f) the amount of that composition i which is assigned the lower limit $Tg^i$ is from 40 to 90% by weight, based on the total amount of the compositions 1 and 2.

The present invention furthermore relates to processes for the preparation of novel aqueous polymer emulsions and their use for coating, adhesive bonding, sealing and impregnating, their use as binders for coating materials and in particular glazes being preferred.

Aqueous polymer emulsions are fluid systems which contain polymer particles distributed in stable disperse form as the disperse phase in the aqueous dispersing medium. The diameter of the polymer particles is in general mainly from 0.01 to 5 μm, frequently mainly from 0.01 to 1 μm.

As in the case of polymer solutions on evaporation of the solvent, aqueous polymer emulsions have the ability to form transparent polymer films on evaporation of the aqueous dispersing medium, and it is for this reason that said emulsions are widely used as binders, for example for surface coatings or materials for coating leather.

In contrast to the polymer solution, however, the type of disperse polymer and the temperature at which film formation takes place determine whether an aqueous polymer emulsion forms a cohesive transparent film or a brittle, opaque pulverizable layer after evaporation of the water. The lowest temperature at which a transparent film without cracks is just formed is to be referred to below as the minimum film formation temperature (MFT) of the relevant aqueous polymer emulsion. No film formation takes place below the MFT (cf. Ullmanns Encyklopädie der technischen Chemie, Vol. 19, 4th edition, Verlag Chemie, Weinheim (1980), page 17).

It is generally known that aqueous emulsions of polymers which essentially contain only polymerized monomers whose homopolymers have low glass transition temperatures Tg (in this publication, Tg is the limit of the glass transition temperature to which, according to G. Kanig, Kolloid-Zeitschrift & Zeitschrift für Polymere, Vol. 190, page 1, equation 1, the glass transition temperature tends with increasing molecular weight, determined by the DSC method (Differential Scanning Calorimetry, 20° C./min, midpoint); the Tg values for the homopolymers of most monomers are known and are stated, for example, in Ullmann's Encyclopedia of Industrial Chemistry, VCH Weinheim, 1992, fifth edition, Vol. A21, page 169; other sources of glass transition temperatures of homopolymers are, for example, J. Brandrup, E. H. Immergut, Polymer Handbook, 1st edition, J. Wiley, N.Y. 1966, 2nd edition, J. Wiley, N.Y. 1975, and 3rd edition, J. Wiley, N.Y., 1989) (ie. soft monomers) are as a rule also capable of forming polymer films at appropriately low temperatures. However, a disadvantage of the resulting films is that they are too soft and too tacky for many applications. This is a disadvantage in that such films readily become soiled, for example through the adhesion of dust. In particular, coatings produced from such films usually also have a low blocking temperature. The latter is the temperature at which such coatings stick together when they are brought into contact with one another under a predetermined contact pressure for some time. Above the blocking temperature, the coatings adhere to one another and can no longer be separated from one another without the coatings being damaged. Blocking can also occur if the coatings are not tacky to the touch. The blocking temperature is important particularly when substrates provided with coatings based on aqueous polymer emulsions are to be stacked one on top of the other or freshly painted windows are to be closed. When the coatings are brought into contact below the blocking temperature, they can be separated from one another again essentially without the use of force and without being damaged.

It is also generally known that aqueous emulsions of polymers which contain essentially only polymerized hard monomers (monomers whose homopolymers have a high glass transition temperature Tg) generally have a high blocking temperature. However, the disadvantage of these aqueous polymer emulsions is that they also require a high temperature for film formation.

It is true that to a certain extent the MFT and blocking temperature (BT) can be adapted to the desired application by copolymerization of hard and soft monomers or by mixing aqueous emulsions of hard polymers with aqueous emulsions of soft polymers or by adding plasticizers. However, the disadvantage of these adaptation measures is that they generally change the MFT and BT to the same extent, ie. they usually increase or decrease the BT and the MFT to a comparable extent.

In terms of application, however, it is desirable to have adaptation measures which are capable of increasing the temperature difference between MFT and BT.

EP-A 184 091, EP-A 376 096, German Published Application DAS 1,220,613, U.S. Pat. No. 3,454,516, EP-A 609 756 and EP-A 379 892 disclose that the abovementioned aim can be essentially realized by spatially combining the free radical aqueous emulsion polymerization in two successive stages, one of the two stages mainly comprising soft polymers and the other stage mainly comprising hard monomers. Surprisingly, the sequence of the two stages, ie. whether the hard stage is polymerized first and then the soft stage or vice versa, tends to play a minor role. For example, EP-A 379 892 describes the sequence hard/soft, whereas EP-A 184 091 uses the sequence soft/hard. Both EP-A 184 091 and EP-A 379 892 furthermore describe the polymerization of a nitrogen-containing adhesion-promoting monomer in the second polymerization stage in order to increase the adhesion of the films of such aqueous polymer emulsions to many materials, such as wood, metal, minerals, paper, textiles and plastic, but in particular to old surface coatings based on drying oils and/or alkyd resins, and to reduce the sensitivity of the adhesion to the effect of humidity and moisture (increased wet adhesion). The placing of the wet adhesion monomers in the second polymerization stage is based on the idea that this results in the production of disperse polymer particles which have the adhesion-promoting monomers localized in particular on their surface, which should promote their adhesion-improving interaction with the substrate to be coated.

EP-A 609 756 relates both to the sequence hard/soft and to the sequence soft/hard. With this polymerization method, EP-A 609 756 associates the idea of forming both hard and soft regions within the disperse polymer particles. Furthermore, EP-A 609 756 like-wise recommends the copolymerization of nitrogen-containing adhesion-promoting monomers for improving the wet adhesion. With regard to the placing of the adhesion-promoting monomers, EP-A 609 756 states that they could be placed both exclusively in the soft or exclusively in the hard regions of the polymer particles and simultaneously in the hard and the soft regions of the polymer particles (page 1, lines 20 to 22). In all embodiments of EP-A 609 756, the realization of this placing is achieved by virtue of the fact that the total amount of the adhesion-promoting monomers is polymerized as part of the second polymerization stage, ie. EP-A 609 756 also starts from the idea of preferred localization of the adhesion-promoting monomers on the surface of the disperse polymer particles. This is also true of DE-A 39 02 067 and EP-A 609 793. The prior art thus provides aqueous polymer emulsions which are satisfactory with respect to the difference between MFT and BT and with regard to the wet adhesion, but the disadvantage of the prior art aqueous polymer emulsions is that their films are unsatisfactory simultaneously with regard to elongation at break and with regard to gloss. An increased elongation at break is important in that the substrates to be coated generally have cracks and/or fissures which become larger or smaller under the action of temperature fluctuations owing to the fact that the coefficients of thermal expansion of the substrates are non-zero, with the result that extension of their coating may occur. This is true in particular when the substrate to be coated is wood. In the latter, humidity fluctuations in particular result in extension processes.

It is an object of the present invention to provide aqueous polymer emulsions which do not have these disadvantages of the prior art aqueous polymer emulsions.

We have found that this object is achieved by the aqueous polymer emulsions defined at the outset, whose films surprisingly have a significantly higher gloss and a significantly higher elongation at break than the prior art films most closely resembling them, without there being any significant reduction in the wet adhesion as a result.

DETAILED DESCRIPTION AND PREFERRED EMBODIMENTS OF THE INVENTION

In principle, the novel procedure can advantageously be applied to all hard/soft or soft/hard sequences mentioned in evaluating the prior art. These are in particular the sequences of EP-A 609 756, EP-A 379 892, EP-A 184 091, EP-A 376 096, German Published Application DAS 1,220,613 and U.S. Pat. No. 3,454,516.

However, those novel aqueous polymer emulsions in which the amount of that monomer composition i which is assigned the lower limit $Tg^i$ is from 50 to 90, better from 60 to 80, preferably from 70 to 80%, by weight, based on the total amount of the compositions 1 and 2, are advantageous. The magnitude of the difference between $Tg^1$ and $Tg^2$ may be at least 30°, 40°, 50°, 60°, 70°, 80°, 90°, 100°, 120°, 150° C. or more and as a rule is therefore from 20° to 150° C. With regard to applications, the magnitude of the difference between $Tg^1$ and $Tg^2$ is advantageously from 60° to 120° C. or from 40° to 80° C.

It is also advantageous if the lower limit $Tg^i$ is from –60° to 35° C., preferably from –30° to +35° C., very particularly preferably from –20° to +20° C.

Correspondingly, it proves advantageous if the higher of the two limits $Tg^1$ is from >50° to 130° C., preferably from 60° to 120° C., very particularly preferably from 95° to 115° C.

In the case of a specified $Tg^i$ for the monomer composition i, the monomer composition i can be established in a simple manner by means of the Fox equation. According to Fox (T. G. Fox, Bull. Am. Phys. Soc. (Ser. II) 1, (1956), 123, and Ullmanns Encyklopädie der technischen Chemie, Verlag Chemie, Weinheim, 1980, Vol. 19, 4th Edition, page 18) a good approximation for the glass transition temperature of random copolymers is $$\frac{1}{Tg} = \frac{X^1}{Tg^1} + \frac{X^2}{Tg^2} + \ldots \frac{X^n}{Tg^n},$$

where $X^1, X^2, \ldots, X^n$ are the mass fractions of the monomers 1, 2, ..., n and $Tg^1, Tg^2, \ldots, Tg^n$ are the glass transition temperatures, in degrees Kelvin, of the polymers composed only of one of the monomers 1, 2 ..., or n.

A random copolymerisation of a monomer composition i can be realized experimentally by polymerizing a corresponding monomer mixture by aqueous emulsion free radical polymerization by the feed method. In this procedure, the monomer mixture is preemulsified in the aqueous phase and is fed into the polymerization vessel at the rate of consumption with the addition of initiators so that the polymerization conversion of the monomers present in the polymerization vessel is ≧99% by weight. Preferred initiators are sodium peroxodisulfate, and the polymerization temperature is usually from 60° to 90° C. The polymerization pressure may be atm, depending on the monomers. The dispersants used may be ≧1 the substances recommended in this publication for the preparation of the novel aqueous polymer emulsions. The molecular weight can be established in a manner known per se by the concommitant use of molecular weight regulators (eg. mercaptans) and/or by means of the amounts of initiator used. In the absence of molecular weight regulators and using from 0.1 to 2% by weight, based on the amount of monomers, of polymerization initiator, an aqueous polymer emulsion whose glass transition temperature corresponds to the limiting Tg can be obtained.

Preferred novel aqueous polymer emulsions are those in which the polymerization stage 1 relates to the monomer composition which is assigned the lower limit $Tg^i$, ie. according to the invention the sequence soft/hard is preferred.

Monoethylenically unsaturated monomers capable of free radical polymerization, such as styrene, a-methylstyrene, o-chlorostyrene or vinyltoluenes, esters of vinyl alcohol with monocarboxylic acids of 1 to 18 carbon atoms, such as vinyl acetate, vinyl propionate, vinyl n-butyrate, vinyl laurate and vinyl stearate, esters of α,β-monoethylenically unsaturated mono- and dicarboxylic acids of, preferably, 3 to 6 carbon atoms, in particular acrylic acid, methacrylic acid, maleic acid, fumaric acid and itaconic acid, with alkanols of in general 1 to 12, preferably 1 to 8, in particular 1 to 4, carbon atoms, especially methyl, ethyl, n-butyl, isobutyl, tert-butyl, 2-ethylhexyl, norbonyl and isobornyl acrylate and methacrylate, dimethyl maleate or n-butyl maleate, nitriles of α,β-monoethylenically unsaturated carboxylic acids, such as acrylonitrile and methacrylonitrile, and conjugated $C_4$–$C_8$-dienes, such as 1,3-butadiene and isoprene, are particularly suitable for producing the monomer compositions 1 and 2. Commercially available monomers VEOVA® 9–11 (VEOVA X is a tradename of Shell and relates to vinyl esters (of carboxylic acids which are also referred to as Versatic® X acids) of the general formula

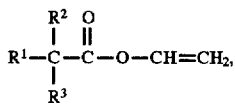

where $R^1$, $R^2$ and $R^3$ are alkyl radicals whose total number of carbon atoms ($R^1+R^2+R^3$) is equal to X minus 2, are also important).

The main part of the monomer compositions 1 and 2 is generally chosen from the abovementioned monomers and altogether accounts for more than 50% by weight, based on the particular monomer composition. Monomers which, when polymerized alone, usually give homopolymers which have high water solubility are usually contained in both monomer compositions only in modifying amounts. These are usually less than 50, as a rule less than 20, preferably from 0.1 to 10, frequently also from 0.1 to 5%, by weight, based on the total amount of the particular monomer composition. Examples of such monomers are α,β-monoethylenically unsaturated ono- and dicarboxylic acids of 3 to 6 carbon atoms and amides thereof, for example acrylic acid, methacrylic acid, maleic acid, fumaric acid, itaconic acid, acrylamide and methacrylamide, as well as vinylsulfonic acid, acrylamidopropanesulfonic acid and water-soluble salts of the abovementioned acids.

Both the monomer composition 1 and the monomer composition 2 preferably contain from 0.1 to 5% by weight, based on the particular monomer composition i, of the abovementioned modifying monomers whose homopolymers have high water solubility.

In addition to the abovementioned monomers, the monomer compositions 1 and 2 may contain minor amounts, as a rule from 0.01 to 5% by weight, based on the particular monomer composition i, of monomers which effect crosslinking of the polymer chains within the individual disperse polymer particles. Particularly suitable in this respect are monomers having two or more nonconjugated ethylenically unsaturated groups, for example the diesters of dihydric alcohols with α,β-monoethylenically unsaturated monocarboxylic acids, among which in turn the acrylates and methacrylates are preferably used. Alkylene glycol diacrylates and dimethacrylates, such as ethylene glycol diacrylate, 1,3-butylene glycol diacrylate, 1,4-butylene glycol diacrylate and propylene glycol diacrylate, may be mentioned by way of example.

Divinylbenzene, vinyl methacrylate, vinyl acrylate, allyl methacrylate, allyl acrylate, diallyl maleate, diallyl fumarate, methylenebisacrylamide, cyclopentadienyl acrylate and triallyl cyanurate are also suitable. Of course, both the monomer composition 1 and the monomer composition 2 may simultaneously comprise such precrosslinking monomers. However, it is sometimes also advantageous if only one of the two monomer compositions contains such pre- crosslinking agents. Frequently, they are only part of the first or of the second polymerization stage. Their exclusive use in the hard polymerization stage is particularly advantageous. However, they may also be present only in the soft polymerization stage.

It is often advantageous if at least one of the two monomer compositions 1 and 2 or both of them comprises or comprise minor amounts, usually from 0.5 to 5% by weight, based on the particular monomer composition i, of monomers which do not effect crosslinking until during film formation.

Examples are carbonyl-containing monomers, such as acrolein, methacrolein, diacetoneacrylamide, diacetonemethacrylamide and vinylaceto acetate. The abovementioned monomers result in postcrosslinking, for example, when the aqueous polymer emulsion simultaneously contains an appropriate added amount of a polyamine compound. Particularly suitable compounds of this type are the dihydrazides of aliphatic dicarboxylic acids of 2 to 10 carbon atoms. Examples of these are oxalic dihydrazide, malonic dihydrazide, succinic dihydrazide, glutaric dihydrazide, adipic dihydrazide and sebacic dihydrazide.

Another monomer which produces postcrosslinking is, for example, 2-acetoacetoxyethyl methacrylate (alone or in combination with polyamines or polyaldehydes, such as glyoxal).

Other polymer building blocks which are suitable for postcrosslinking are those which contain hydrolyzable organosilicon bonds. Examples are the copolymerizable monomers methacryloyloxypropyltrimethoxysilane and vinyltrimethoxysilane. Further suitable polymer building blocks of a corresponding type are described in DE-A 43 41 260. If the disperse polymer particles have carboxyl groups, postcrosslinking can also be effected by adding metal salts having polyvalent cations (for example Mg, Ca, Zn or Zr salts).

Epoxy-, hydroxyl- and/or N-alkylol-containing monomers, for example glycidyl acrylate, N-methylolacrylamide and -methacrylamide and monoesters of dihydric alcohols with α,β-monoethylenically unsaturated carboxylic acids of 3 to 6 carbon atoms, such as hydroxyethyl, hydroxy-n-propyl or hydroxy-n-butyl acrylate and methacrylate, are also suitable for postcrosslinking.

If the novel aqueous polymer emulsions comprise systems which effect precrosslinking and/or postcrosslinking, the glass transition temperatures $Tg^1$ and $Tg^2$ to be assigned in accordance with the definition to the monomer compositions 1 and 2 are understood as meaning the glass transition temperatures to be determined in the absence of these crosslinking components present only in minor amounts. As a rule, the precrosslinking and/or postcrosslinking have an advantageous effect on the initial blocking temperature (directly after film formation) and the final blocking temperature (after several days).

The monomer compositions 1 and 2 are preferably chosen, in the manner described above, exclusively from the following monomers: n-butyl acrylate, 2-ethylhexyl acrylate, ethyl acrylate, methyl ethacrylate, n-butyl methacrylate, styrene, acrylonitrile, acrylic acid, methacrylic acid, acrylamide, methacrylamide, hydroxyethyl acrylate, hydroxyethyl methacrylate, n-hydroxypropyl acrylate, n-hydroxypropyl methacrylate, acrylamidopropanesulfonic acid and vinylsulfonic acid and the alkali metal salts thereof.

Particularly preferably, the monomer compositions 1 and 2 are chosen, in the manner described above, exclusively from the following monomers:

n-butyl acrylate, 2-ethylhexyl acrylate, methyl methacrylate, n-butyl methacrylate, acrylic acid, methacrylic acid, acrylamide and methacrylamide.

In general, it proves advantageous if, on the one hand, the monomer composition i having the lower $Tg^i$ value comprises from 10 to 50% by weight, based on the monomer composition i, of monomers whose homopolymers have Tg values above the lower $Tg^i$ and, on the other hand, the monomer composition i having the higher $Tg^i$ value simultaneously comprises from 0 to 25% by weight, based on the monomer composition i, of monomers whose homopolymers have Tg values below the higher $Tg^i$. In general, advantageous novel aqueous polymer emulsions are those whose MFT is $\leq 30°$ C., preferably $\leq 10°$ C., without the addition of film formation assistants.

Particularly suitable nitrogen-containing adhesion-promoting monomers are monomers which are capable of free radical polymerization and have at least one amino, ureido or N-heterocyclic group.

A large number of such suitable adhesion-promoting monomers are described in EP-B 421 185, EP-B 379 892, page 3, EP-A 609 756, page 2, DE-A 43 34 178, DE-A 3 902 067, pages 3 and 4, and the references cited in these publications.

Examples are aminoethyl acrylate and methacrylate, dimethylaminoethylacrylate and methacrylate, diethylaminoethyl acrylate and methacrylate, dimethylaminopropyl acrylate and methacrylate, 3-dimethylamino-2,2-dimethylprop-1-yl acrylate and methacrylate, 2-N-morpholinoethyl acrylate and methacrylate, 2-N-piperidinoethyl acrylate and methacrylate, N-(3-dimethylaminopropyl)acrylamide and -methacrylamide, N-dimethylaminoethylacrylamide and -methacrylamide, N-diethylaminoethylacrylamide and -methacrylamide, N-(4-morpholinomethyl)acrylamide and -methacrylamide, vinylimidazole and monoethylenically unsaturated derivatives of ethyleneurea, such as N-(2-acryloyloxyethyl)ethyleneurea, N-(β-acrylamidoethyl) ethyleneurea, N-2-(allylcarbamato) aminoethylimidazolidinone (WAM IV from Air Products and Chemicals), N-(3-allyloxy-2-hydroxypropyl) aminoethylethyleneurea (Sipomer® WAM from Alcolac), N-vinylethyleneurea, N-vinyloxyethylethyleneurea, N-methacryloyloxyacetoxyethylethyleneurea, N-(acrylamidomethylene)ethyleneurea, N-(methacrylamidomethylene)-ethyleneurea and the particularly preferred N-(2-methacryloyloxyethyl) ethyleneurea ≡ 1-(2-methacryloyloxyethyl)imidazolin-2-one ≡ ureidoethyl methacrylate ≡ ethyleneureaethyl methacrylate (Plex® 6844-0 from Röhm GmbH) and N-(methacrylamidoethyl)ethyleneurea ≡ N-(β-methacrylamidoethyl)ethyleneurea (Sipomer WAM II from Rhone-Poulenc). Further particularly suitable ureido monomers are stated in a review article by R. W. Kreis, A. M. Sherman, Developments in Ureido Functional Monomer for Promoting Wet Adhesion in Latex Paints, Water-Borne and Higher Solids Coating Symposium of Feb. 3 to 5, 1988, New Orleans, La.

Preferably from 30 to 100 mol % or from 40 to 100 mol % or from 50 to 100 mol % of the nitrogen-containing adhesion-promoting monomer to be polymerized according to the definition are polymerized in polymerization stage 1. With regard to an optimum balance of all desired properties, particularly advantageous novel aqueous polymer emulsions are obtained when from 40 to 60 mol % of the total amount of adhesion-promoting monomers to be polymerized according to the definition are copolymerized in polymerization stage 1.

The novel aqueous polymer emulsions are preferably produced with a solids content of $\geq 40$, advantageously $\geq 50\%$, by volume, based on the total aqueous polymer emulsion. As a rule, the advantageous solids content for applications is from 40 to 70% by volume.

Regarding the desired performance characteristics, it is advantageous if the weight average diameter of the disperse polymer particles is from 40 to 300 nm. Particularly advantageous weight average polymer particle diameters are from 50 to 150 nm or from 50 to 120 nm. Unless the dynamic viscosity of the novel aqueous polymer emulsion plays the decisive role, the distribution of the polymer particle diameters is preferably narrow. The nonuniformity of the polymer particle diameter distribution should be less than 5, preferably less than 2. It is a ratio of weight average to number average polymer particle diameter.

The preparation of the novel aqueous polymer emulsions is carried out according to the product by process definition of the subject according to the invention, as stated at the outset, ie. by the free radical aqueous emulsion polymerization method in the presence of dispersants and free radical polymerization initiators.

The ratio of the aqueous phase to the total amount of the monomers used in both stages is chosen according to the desired solids content of the aqueous polymer emulsion to be prepared.

The monomer composition 1 may be initially taken in its entirety as a corresponding monomer mixture in the form of an aqueous monomer emulsion in the polymerization vessel or some or all of said monomer composition 1 may be metered into said vessel in the course of the polymerization stage 1 as an emulsion in an aqueous medium or in anhydrous form. The monomer composition 1 can of course be realized only over the total polymerization stage 1 when considered in an integral manner. In this case, a monomer mixture whose composition changes as a function of time and corresponds to the monomer composition 1 only when considered in an integral manner is added to the polymerization vessel. This latter procedure is less preferable. After the end of the polymerization stage 1, the monomer composition 2 can be added in a corresponding manner to the polymerization vessel, all at once or partly or in total in the course of the polymerization stage 2, as an emulsion in an aqueous medium or in anhydrous form. The novel adhesion-promoting monomers to be polymerized are preferably mixed into the other monomers or the emulsions thereof and introduced in this form into the polymerization vessel. Thus, monomer mixtures whose composition is constant as a function of time are preferably added to the polymerization vessel over the particular polymerization stage, in both polymerization stages. The latter is advantageously carried out in such a way that the polymerization conversion of the monomers already added to the polymerization vessel is $\geq 90$, preferably $\geq 95$, particularly preferably $\geq 98\%$, by weight at any time after the beginning of the polymerization.

In both stages, the polymerization is initiated by conventional free radical initiators. Suitable initiators are all those which are capable of initiating a free radical aqueous emulsion polymerization. These may be both peroxides, for example alkali metal or ammonium peroxodisulfate, and azo compounds, such as azobisisobutylronitrile or 4,4'-azobiscyanovaleric acid. Combined systems which are composed of at least one organic reducing agent and at least one peroxide and/or hydroperoxide, for example tert-butyl hydroperoxide and the sodium salt of hydroxymethanesulfinic acid or hydrogen peroxide and ascorbic acid, and very particularly preferably combined systems which furthermore contain a small amount of a metal compound which is soluble in the polymerization medium and whose metallic component may occur in a plurality of valency states, for example ascorbic acid/iron(II) sulfate/hydrogen peroxide, are also advantageously used, the sodium salt of hydroxymethanesulfinic acid, sodium sulfite or sodium bisulfite also frequently being used instead of ascorbic acid and alkali metal peroxodisulfate and/or ammonium peroxodisulfate often being used instead of hydrogen peroxide. Instead of a water-soluble iron(II) salt, a V salt or a combination of water-soluble Fe/V salts is also frequently used. The amount of the free radical initiator systems used is preferably from 0.1 to 2% by weight, based on the total amount of the monomers to be polymerized. Depending on their type, the polymerization initiators may be initially taken all at once in the polymerization vessel in a manner known per se to a person skilled in the art or may be added continuously to said vessel at the rate at which they are consumed, ie. according to the progress of the polymerization.

The polymerization pressure and polymerization temperature are of fairly minor importance. In general, both polymerization stages are carried out at from room temperature to 100° C., preferably from 50° to 95° C., particularly preferably from 60° to 90° C. Reduced or superatmospheric pressure may be used, so that the polymerization temperature may also exceed 100° C. and may be up to 130° C. or more. Readily volatile monomers, such as ethylene or butadiene, are preferably polymerized under superatmospheric pressure. For regulating the pH of the polymerization medium, pH buffers, such as $NaHCO_3$, $Na_2CO_3$, sodium acetate or $Na_2P_2O_5$, are preferably added during the novel free radical aqueous emulsion polymerization. pH buffers are advantageously incorporated into the aqueous monomer emulsions to be introduced. Buffering is preferably effected to a pH of from 3 to 6. This measure results in the novel aqueous polymer emulsions having greater freedom from coagulum and specks (microcoagulum). Alternatively to the use of buffers, the aqueous monomer emulsion to be fed in may also be partly neutralized by means of a strong base (eg. NaOH) to a pH of from 3 to 6 before being added. The ready-to-use final pH of the novel aqueous polymer emulsions is generally increased to above 7, preferably up to 9, by adding bases, such as ammonia, alkali metal hydroxide (NaOH, KOH), alkali metal oxide, alkaline earth metal oxide, alkaline earth metal hydroxide $(Ca(OH)_2)$, ZnO, metal carbonates, metal bicarbonates or amines, such as 2-amino-2-methyl-1-propanol, ethanolamine, diethanolamine, triethylamine, morpholine, N,N-dimethylethanolamine or 2-dimethylamino-2-methyl-1-propanol.

To improve the reproducibility and establish defined particle diameters, the polymer particle formation phase and polymer particle growth phase are advantageously decoupled from one another in a manner known per se to a person skilled in the art by initially taking a defined amount of a preformed aqueous polymer emulsion (a seed latex) in the polymerization vessel or preforming such an emulsion in situ in said vessel. The amount of dispersant added in the further course of the free radical aqueous emulsion polymerization is as a rule such that the critical micelle formation concentration is not exceeded and formation of new polymer particles is thus avoided. If a broad particle diameter distribution is desirable for producing highly concentrated aqueous novel polymer emulsions, seed latex is generally added to the polymerization vessel additionally during the free radical aqueous emulsion polymerization in a manner known per se. Molecular weight regulators, for example mercaptans, may of course concommitantly be used in the novel free radical aqueous emulsion polymerization. This generally facilitates the film formation (lower MFT) and thus enhances the gloss level. However, the polymerization is frequently carried out in the absence of said regulators. As in the case of free radical polymerization methods generally, the novel method can be used, in a manner known to a person skilled in the art, both under an inert gas atmosphere (eg. $N_2$, Ar) and under a nitrogen-containing atmosphere (eg. air).

Suitable dispersants which ensure in particular the stability of the novel aqueous polymer emulsion are both the protective colloids usually used for carrying out the free radical aqueous emulsion polymerization and emulsifiers.

Suitable protective colloids are, for example, polyvinyl alcohols, cellulose derivatives or vinylpyrrolidone-containing copolymers. A detailed description of further suitable protective colloids is given in Houben-Weyl, Methoden der organischen Chemie, Volume XIV/1, Makromolekulare Stoffe, Georg-Thieme-Verlag, Stuttgart, 1961, pages 411 to 420. Mixtures of emulsifiers and/or protective colloids may of course also be used. Preferably used dispersants are exclusively emulsifiers with relative molecular weights, in contrast to the protective colloids, of usually less than 2000, preferably less than 1000. They may be anionic, cationic or nonionic. Where mixtures of surfactants are used, the individual components must of course be compatible with one another, which in case of doubt can be tested by means of a few preliminary experiments. In general, anionic emulsifiers are compatible with one another and with nonionic emulsifiers. The same applies to cationic emulsifiers, whereas anionic and cationic emulsifiers are generally incompatible with one another. Useful emulsifiers are, for example, ethoxylated mono-, di- and trialkylphenols (degree of ethoxylation: 3 to 100, alkyl radical: $C_4$ to $C_{12}$), ethoxylated fatty alcohols (degree of ethoxylation: 3 to 100, preferably 6 to 50, alkyl radical: $C_6$ to $C_{20}$) and alkali metal and ammonium salts of alkylsulfates (alkyl radical: $C_8$ to $C_{18}$), of sulfuric half-esters of ethoxylated alkanols (degree of ethoxylation: 1 to 70, in particular 2 to 10, alkyl radical: $C_{10}$ to $C_{18}$) and of ethoxylated alkylphenols (degree of ethoxylation: 3 to 100, preferably 6 to 50, alkyl radical: $C_4$ to $C_{18}$) and alkali metal and ammonium salts of alkanesulfonic acids (alkyl radical: $C_{10}$ to $C_{18}$) and of alkylarylsulfonic acids (alkyl radical: $C_9$ to $C_{18}$). Further suitable emulsifiers, such as sulfosuccinates, are described in Houben-Weyl, Methoden der organischen Chemie, Volume XIV/1, Makromolekulare Stoffe, Georg-Thieme Verlag, Stuttgart, 1961, pages 192 to 208.

Compounds of the general formula I

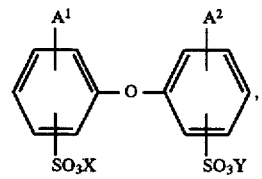

where $A^1$ and $A^2$ are each hydrogen or $C_4$–$C_{24}$-alkyl and are not simultaneously hydrogen and X and Y may be alkali metal ions and/or ammonium ions, have also proven to be suitable surfactants. In the formula I, $A^1$ and $A^2$ are each preferably linear or branched alkyl of 6 to 18, in particular 6, 12 or 16, carbon atoms or hydrogen, and $A^1$ and $A^2$ are not both simultaneously hydrogen. X and Y are preferably sodium, potassium or ammonium ions, sodium being particularly preferred. Compounds I in which X and Y are sodium, $A^1$ is a branched alkyl radical of 12 carbon atoms and $A^2$ is hydrogen or $A^1$ are particularly advantageous. Industrial mixtures which contain from 50 to 90% by weight of the monoalkylated product, for example Dowfax® 2A1 (trademark of Dow Chemical Company), are frequently used. The compounds I are preferably used as dispersants in the novel process alone or, particularly preferably, as a mixture with ethoxylated fatty alcohols (degree of ethoxylation: 3 to 50, alkyl radical: $C_8$ to $C_{36}$). The compounds I are generally known, for example from U.S. Pat. No. 4,269,749, and are commercially available.

As a rule, the amount of dispersant used is from 0.5 to 6, preferably from 1 to 5, particularly preferably from 2 to 4%, by weight, based on the monomers to be subjected to free radical polymerization.

Remarkably, the internal strength of films of the novel aqueous polymer emulsions can be increased particularly where the disperse polymer, owing to the copolymerization of adhesion-promoting monomers, contains at least one group of the general formula II

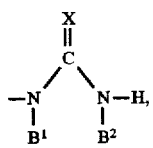
(II)

where
X is O or S and
$B^1$ and $B^2$ are each hydrogen or $C_1$–$C_5$-alkyl or both together form a bridging $C_2$–$C_4$-alkylene group which may be unsubstituted or monosubstituted or disubstituted by $C_1$–$C_4$-alkoxy and/or hydroxyl, by the simultaneous presence of at least one chemical compound having at least two unprotected and/or reversibly protected aldehyde groups in the novel aqueous polymer emulsion, the ratio of the total molar amount of groups II contained in the aqueous polymer formulation to the total molar amount of abovementioned unprotected and/or reversibly protected aldehyde groups contained in the aqueous polymer emulsion being from 0.1:1 to 10:1.

Remarkably, such novel aqueous polymer emulsions have a satisfactory shelf life. It is also remarkable that the wet adhesion is essentially not adversely affected by the postcrosslinking. Moreover, films of novel aqueous polymer emulsions postcrosslinked in this way have higher water resistance and less tendency to blooming. The abovementioned molar ratio is preferably 1:0.1 to 1:2, particularly preferably from 1:0.1 to 1:1, very particularly preferably from 1:0.5 to 1:1. Groups of the general formula II which are particularly preferred in the abovementioned sense and particularly advantageous aldehydic compounds are described in EP-A 609 793 and DE-A 43 34 178. Glyoxal and glutardialdehyde are particularly advantageous aldehydic compounds.

Novel aqueous polymer emulsions are typically used in the area of aqueous coating materials, in particular those which are free of organic solvents, where the film formed from the aqueous polymer emulsion adhesively bonds to the substrate.

This area includes in particular surface coatings for interior and exterior applications in the building trade.

Other examples are industrial coating materials, in particular where elevated temperatures cannot be realized or are difficult to realize in their application. Examples of such coatings are finishes, wash primers, insulations and heatsealable adhesive layers. The novel aqueous polymer emulsions are also suitable for the consolidation of sheet-like fibrous structures. While films of the pure plastics emulsions are suitable for the last-mentioned applications, they are generally pigmented and/or mixed with fillers for the coating sector. Conventional formulations may be used here, the advantages of low MFT, high BT, good gloss and high elongation at break always being displayed. Glazes, finishes, silk gloss coats, gloss coats and high gloss coats and materials for coating leather may be mentioned in particular here. Examples of particularly suitable substrates are wood, leather, metal, plastic and mineral materials. The novel polymers are also suitable as additives in mineral binders, in particular those based on cement.

Especially in the case of interior applications, it is necessary for the novel aqueous polymer emulsions to be substantially free of residual monomers and organic solvents. This can be achieved in a manner known per se, for example by removal by distillation (in particular steam distillation) or by stripping with an inert gas. Free radical postpolymerization methods can of course also be used (in particular with the action of redox initiator systems), as stated, for example, in DE-A 44 35 423, DE-A 44 19 518 and DE-A 44 35 422 or cited as prior art.

The polymers dispersed in the novel aqueous polymer emulsions may be isolated, for example, by careful spray drying or by coagulation in a manner known per se and subsequent thorough washing. Where they are not directly redispersible as such in an aqueous medium, they generally dissolve in organic solvents. These solutions can be transferred to an aqueous medium and transformed into a stable dispersion of the polymer in the aqueous medium with removal of the organic solvent by distillation and addition of a dispersant.

EXAMPLES

A) Preparation of novel aqueous polymer emulsions D1 to D6 and of comparative dispersions VD1 to VD4

A mixture of
200 g of water,
25 g of a 20% strength by weight aqueous solution of ethoxylated fatty alcohol (alkyl radical: $C_{16}/C_8$ mixture, average degree of ethoxylation: 18)=emulsifier solution 2,
60g of a 15% strength by weight aqueous solution of sodium laurylsulfate=emulsifier solution 1,
10g of feed 1 and
10 g of feed 3 was initially taken in a polymerization vessel and heated to 85° C. in the course of 10 minutes. Stirring was carried out for 10 minutes at 85° C., after which the remaining amount of feed 1 was continuously metered into the polymerization vessel in the course of 1.5 hours while maintaining the temperature of 85° C. Beginning simultaneously with the remaining amount of feed 1, the remaining amount of feed 3 was continuously fed into the polymerization vessel in the course of 2 hours. After the end of feed 1, feed 2 was continuously fed into the polymerization vessel in the course of 30 minutes while further maintaining the temperature of 85° C. The polymerization mixture was then stirred for a further 2 hours at 85° C. Thereafter, the mixture was cooled to 25° C., 6 ml of concentrated aqueous ammonia solution were added and the emulsion was filtered through a filter having a mesh size of 250 µm.

Feed 1
90+X g of water,
250 g of n-butyl acrylate,
125 g of methyl methacrylate,
6.4 g of acrylic acid,
4.3 g of a 50% strength by weight aqueous solution of acrylamide,
0.5 g $Na_4P_2O_7$ 2.1g of emulsifier solution 1,
22.5g of emulsifier solution 2
X g of ureidoethyl methacrylate.
Feed 2
  30+Y g of water,
  125 g of methyl methacrylate,
  Y g of ureidoethyl methacrylate,
  1.1 g of acrylic acid,
  0.7 g of a 50% strength by weight aqueous acrylamide solution,
  6.7 g of emulsifier solution 1
  3.75g of emulsifier solution 2.
Feed 3
  2.5g of sodium peroxodisulfate dissolved in 100 g of water.

Table 1 below shows the specifically used values for X and Y, characterizes the resulting aqueous polymer emulsions and indicates the performance characteristics obtained with coating formulations prepared using these aqueous polymer emulsions.

TABLE 1

| Emulsion | X (g) | y (g) | Solids content (% by weight) | Blocking resistance (after 1 h/after 24 h) | MFT (°C.) | Wet adhesion | Elongation at break (%) | Gloss (mean value/peak value) |
|---|---|---|---|---|---|---|---|---|
| VD1 | — | — | 49.2 | 0/0 | <6 | 6 | 519 | 18/18 |
| VD2 | — | 5 | 49.7 | 0.5/0.5 | 8 | 3.5 | 295 | 67/67 |
| VD3 | — | 7.5 | 50.1 | 0/0 | 7 | 3 | 224 | 64/65 |
| VD4 | — | 10 | 49.5 | 0/1 | 8 | 3 | 236 | 61/63 |
| D1 | 5 | — | 50.7 | 0/0 | <6 | 4 | 478 | 73/73 |
| D2 | 7.5 | — | 50.1 | 0/0.5 | <6 | 4 | 458 | 73/73 |
| D3 | 10 | — | 49.5 | 0/1 | <6 | 2 | 434 | 72/72 |
| D4 | 5 | 5 | 49.6 | 0/0 | <6 | 3 | 310 | 68/69 |
| D5 | 7.5 | 2.5 | 49.8 | 0/0 | <6 | 2 | 425 | 72/73 |
| D6 | 2.5 | 7.5 | 49.9 | 0/0.5 | 10 | 3.5 | 295 | 69/70 |

Description of the test methods used for determining the performance characteristics shown in Table 1
a) Formulation of a protective wood glase and determination of the blocking resistance Protective wood glazes were formulated from the aqueous polymer emulsions VD1 to VD4 and D1 to D6 as follows:
  100 g of water,
  2 g of 30% strength by weight aqueous solution of the ammonium salt of a medium molecular weight polyacrylic acid (pigment disperser A from BASF AG),
  50 g of propylene glycol,
  16 g of Syloid® ED5 (dulling agent from Grace GmbH, Worms),
  5 g of Mergal® BCM (fungicide/blue stain inhibitor combination from Riedel-de-Haen AG, Seelze),
  3 g of Agitan® 232 (antifoam from Muzing Chemie GmbH, Heilbronn),
  19 g of butylglycol,
  5 g of Lusolvan® FBH (film formation assistant from BASF AG),
  700 g of aqueous polymer emulsion,
  30 g of water,

| 65 g Luconyl® yellow and | pigment preparations from |
| 5 g Luconyl® red | BASF AG. |

To test the blocking resistance of the prepared protective wood glazes, square test specimens having an edge length of 2 cm were cut from Leneta films (sintered PVC films containing carbon black, from Schwegmann GmbH in D-53501 Grafschaft Gelsdorf) coated with the glazes in a wet thickness of 100 μm, after drying for 24 hours at 23° C. and 50% relative humidity, and the coated sides of pairs of said test specimens were pressed against one another over a period of 1 hour and 24 hours under an applied mass of 5 kg at 60° C. The test pieces were cooled to 23° C. and then separated from one another, and the force required to do so and the resulting film characteristics were evaluated on the basis of the following scale of values:

0: test pieces fall apart under their own weight and the films remain intact;
1: test pieces can be separated from one another without significant use of force but the films remain intact;
2: slight force has to be applied to separate the test pieces but the films remain intact;
3: greater force has to be applied to separate the test pieces, and small holes and cracks are produced in the films;
4: considerable force has to be applied to separate the test pieces, and larger holes and cracks are produced in the films;
5: test pieces can be separated from one another only with the application of very considerable force, and the films are considerably damaged during separation.

b) Determination of the minimum film formation temperature (MFT)

The minimum film formation temperature was determined for the pure aqueous polymer emulsion according to Ullmanns Encyklopädie der technischen Chemie, Vol. 19, Verlag Chemie, Weinheim (1980), page 17. The measuring instrument used was a film formation bench (=metal plate to which a temperature gradient is applied). The film produced had a thickness of 500 μm when wet. The MFT is the temperature at which cracks began to appear in the film.

c) Formulation of a silk gloss coating material and determination of the wet adhesion Silk gloss coating materials were formulated from the aqueous polymer emulsions VD1 to VD4 and D1 to D6 as follows:
  89 g of water,
  6 g of 25% strength by weight aqueous solution of the sodium salt of a copolymer of maleic acid and diisobutylene (dispersant for pigments and fillers),
  2 g of Parmetol® A23 (preservative),
  9 g of Natrosol® 250 HR (4% strength by weight aqueous thickener solution based on hydroxyethylcellulose),
  32 g of propylene glycol,
  10 g of butyldiglycol,
  4 g of Agitan® 702 (antifoam),
  210 g of Kronos® RHD-2 (finely divided $TiO_2$ pigment),
  106 g of talc SE Micro (filler), 10 g of Collacral® PU75 (Polyurethane associated thickener),
13 g of butyldiglycol,
5 g of Kristallöl® K60 (hydrocarbon mixture as film formation assistant) and
504 g of aqueous polymer emulsion.

To test the wet adhesion of the silk gloss coating materials formulated as described above to alkyd resin coating, a high-gloss solvent-containing commercial alkyd resin coating material was first applied to Leneta film in a wet coat thickness of 120 µm and was dried for one day at room temperature and for 7 days at 50° C. in a through-circulation dryer. The alkyd resin primer coat was cooled to 23° C., after which the particular silk gloss coating material was applied to it in a wet coat thickness of 200 µm and dried for 3 days at 23° C./65% relative humidity. The surface was then damaged by cutting with a knife and, in order to test the wet adhesion of the top coat to the alkyd resin primer coat, the films prepared as described were subjected to a plurality of successive frost-thaw cycles. In the course of one frost-thaw cycle, the coated films were first stored for 8 hours in water at 23° C., then kept for 16 hours at −20° C. and then placed in water for 10 minutes at 23° C. After the fifth frost-thaw cycle, the adhesion of the topcoat to the primer coat was tested at 23° C. at the incision point and was rated according to the following scale of values:
1=excellent
2=good
3=completely satisfactory
4=satisfactory
5=poor
6=insufficient d) Determination of the elongation at break (%)

The elongation at break was determined on the basis of DIN 53455 and DIN 53504. The measured values stated are mean values of 5 measurements on 5 test specimens.

For the production of the test specimens, a mixture of
60 g of aqueous polymer emulsion,
4 g of butylglycol and
56 g of water
was prepared in each case and samples were converted into films (0.5 mm dry thickness) in a silicone mold over a period of 7 days at 23° C. at 50% relative humidity. After removal of the film from the silicone mold, the test specimens required for carrying out the tensile test were punched out of said films.

The test specimen format used was the dumbbell format described in DIN 53504 (cf. 2.4.11.6) as standard bar S2. The thickness of the samples was checked with the thickness measuring apparatus according to DIN 53370, having a circular tracing form of 10 mm diameter.

The test specimens were clamped in the clamps of a tensile test machine and torn at a take-off speed of 200 mm/min. The elongation at break is the elongation at the instant of tearing. It is based on 23° C. It is expressed as $(L-L_o/L_o) \times 100$ (%), where
$L_o$ is the original measured length and
L is the measured length on tearing.

e) Carrying out gloss measurements

Coats of the aqueous polymer emulsions were applied in a wet thickness of 200 µm to Leneta film measuring 16 cm×8 cm. After film formation had continued for 24 hours at 23° C. and 50% relative humidity, the gloss of the film was determined at 23° C. and angle of observation of 60° using a Micro-TRI gloss reflectometer from BYK-Gardner at 3 measuring points randomly selected on the film surface. The mean value of the 3 determinations and the maximum value are stated. An increasing gloss value reflects increasing gloss.

B) Postcrosslinking of novel aqueous polymer emulsions with glyoxal

The novel aqueous polymer emulsion D7 was prepared by the general preparation method stated in A), the initially taken mixture and feeds having the following composition:

Initially taken mixture:
380 g of water,
120 g of emulsifier solution 1,
25 g of emulsifier solution 2,
20 g feed 1,
30 g feed 3.

Feed 1
200 g of water,
420 g of n-butyl acrylate,
330 g of methyl methacrylate,
10 g of ureidoethyl methacrylate,
7.5 g of acrylic acid,
8.5 g of 50% strength by weight aqueous solution of acrylamide,
1 g $Na_4P_2O_7$
4.3 g of emulsifier solution 1 and
37.5 g of emulsifier solution 2.

Feed 2
70 g of water,
250 g of methyl methacrylate,
10 g of ureidoethyl methacrylate,
7.5 g of acrylic acid,
1.5 g of 50% strength by weight aqueous solution of acrylamide,
13.3 g of emulsifier solution 1 and
37.5 g of emulsifier solution 2.

Feed 3
200 g of water and
1.5 g of sodium peroxodisulfate.

Zg of a 40% strength by weight aqueous glyoxal solution were stirred into 500 ml of each of the resulting aqueous polymer emulsions D7. The aqueous polymer emulsions obtained were tested as follows for water absorption and resistance to blooming:

a) Determination of the water absorption (WA)

About 500 µm thick polymer films were produced from the glyoxal-containing aqueous polymer emulsions after dilution with water to a solids content of 25% by weight, by converting a defined amount of aqueous polymer emulsion into a film over a period of 5 days at 23° C. and 50% relative humidity in a silicone pan.

The polymer films were then removed from the silicone pan, and sheet-like square film pieces (about 4 cm$^2$) were punched out. These were placed in 100 ml of demineralized water for 24 hours at 23° C.

The water absorption of the sample pieces was determined gravimetrically. It is stated in Table 2 in % by weight, based on the initial weight of the test specimen.

b) Determination of the resistance to blooming (RB)

The glyoxal-containing aqueous polymer formulations were applied by means of a knife coater to a glass sheet to give a layer which was 200 µm thick when wet, and were converted into a film over a period of 24 hours at 23° C. and 50% relative humidity. The glass sheets coated in this manner were placed vertically, at 23° C. for 4 hours, in a trough filled with demineralized water. The sheets were then removed from the trough and the films were checked visually for blooming and blister formation.

The results obtained are shown in Table 2.

TABLE 2

| Amount D7 | Z | Molar ratio of ureido/ aldehyde groups | WA (% by weight) | RB |
|---|---|---|---|---|
| 500 ml | — | — | 28.2 | many small blisters, very great opacity |
| 500 ml | 0.43 | 1:0.25 | 22.3 | many small blisters, great opacity |
| 500 ml | 0.86 | 1:0.5 | 20.1 | no blister formation, slight opacity |
| 500 ml | 1.72 | 1:1 | 18.9 | no blister formation, no opacity (transparent film) |

C) Preparation of further novel aqueous polymer emulsions and determination of performance characteristics In all cases, the preparation was carried out according to the general preparation method in A. In the case of the emulsions D15 and D16, the total feed time (=feed time of feed 1+feed time of feed 2) was likewise 2 hours, but the feed times of feeds 1 and 2 were chosen so that their ratio corresponded to the weight ratio of the particular total amount of monomers contained in feeds 1 and 2. The determinations for the performance characteristics were also carried out as in A). The composition of the initially taken mixture and of the feeds and the performance characteristics are shown in Table 3. The following abbreviations were used there:

BA=n-butyl acrylate,
MMA=methyl methacrylate,
UMA=ureidoethyl methacrylate,
AA=acrylic acid,
MAA=methacrylic acid
AM=50% strength by weight aqueous acrylamide solution,
GS=40% strength by weight aqueous glyoxal solution,
BDA=1,4-butylene glycol diacrylate,
NaPS=sodium peroxodisulfate,
DAAM=50% strength by weight aqueous diacetoneacrylamide solution,
ADDH=adipic dihydrazide,
E1=aqueous emulsifier solution 1,
E2=aqueous emulsifier solution 2,
F1=feed 1,
F2=feed 2.

The amounts are stated in each case in g.

TABLE 3

| Initially taken mixture | D8 | D9 | D10 | D11 | D12 | D13 | D14 | D15 | D16 | D17 | D18 | D19 |
|---|---|---|---|---|---|---|---|---|---|---|---|---|
| Water | 200 | 200 | 200 | 200 | 200 | 200 | 200 | 200 | 200 | 200 | 200 | 200 |
| E1 | 60 | 60 | 60 | 60 | 60 | 60 | 66.7 | 60 | 60 | 60 | 60 | 60 |
| E2 | 12.5 | 12.5 | 12.5 | 12.5 | 12.5 | 12.5 | — | 12.5 | 12.5 | 12.5 | 25 | 25 |
| F1 | 10 | 10 | 10 | 10 | 10 | 10 | 10 | 10 | 10 | 10 | 10 | 10 |
| F2 | 15 | 15 | 15 | 15 | 15 | 15 | 15 | 15 | 15 | 15 | 10 | 10 |
| Feed 1 | | | | | | | | | | | | |
| Water | 95 | 95 | 95 | 95 | 95 | 95 | 95 | 95 | 80 | 95 | 88 | 85 |
| BA | 250 | 250 | 250 | 250 | 250 | 250 | 250 | 250 | 250 | 250 | 250 | 250 |
| MMA | 125 | 125 | 125 | 125 | 125 | 125 | 125 | 100 | 75 | 125 | 125 | 125 |
| UMA | 5 | 5 | 5 | 5 | 5 | 5 | 5 | 5 | 5 | 5 | 3.8 | 2.5 |
| AA | 6.4 | 3.8 | 3.8 | 3.8 | 3.8 | 3.8 | 3.8 | 3.8 | 3.8 | 5MAS | 6.4 | 6.4 |
| AM | 4.3 | 4.3 | 4.3 | 4.3 | 4.3 | 4.3 | 4.3 | 4.3 | 4.3 | 4.3 | 4.3 | 4.3 |
| E1 | 2.1 | 2.1 | 2.1 | 2.1 | 2.1 | 2.1 | 6.7 | 2.1 | 2.1 | 2.1 | 2.1 | 2.1 |
| E2 | 18.8 | 18.8 | 18.8 | 18.8 1,5 BDA | 18.8 15 g DAAM | 18.8 | — | 18.8 | 18.8 | 18.8 | 22.5 | 22.5 |
| Feed 2 | | | | | | | | | | | | |
| Water | 35 | 35 | 35 | 35 | 35 | 35 | 35 | 35 | 55 | 35 | 40 | 40 |
| MMA | 125 | 125 | 125 | 125 | 125 | 125 | 125 | 150 | 175 | 125 | 125 | 125 |
| UMA | 5 | 5 | 5 | 5 | 5 | 5 | 5 | 5 | 5 | 5 | 3.8 | 2.5 |
| AA | 1.1 | 3.8 | 3.8 | 3.8 | 3.8 | 3.8 | 3.8 | 3.8 | 3.8 | 5MAS | 1.1 | 1.1 |
| AM | 0.8 | 0.8 | 0.8 | 0.8 | 0.8 | 0.8 | 0.8 | 0.8 | 0.8 | 0.8 | 0.8 | 0.8 |
| E1 | 6.7 | 6.7 | 6.7 | 6.7 | 6.7 | 6.7 | 6.7 | 6.7 | 6.7 | 6.7 | 6.7 | 6.7 |
| E2 | 18.8 | 18.8 | 18.8 | 18.8 | 18.8 | 18.8 | — | 18.8 | 18.8 | 18.8 | 18.8 | 18.8 |
| Feed 3 | | | | | | | | | | | | |
| Water | 100 | 100 | 100 | 100 | 100 | 100 | 100 | 100 | 100 | 100 | 100 | 100 |
| NaPS | 1.5 | 1.5 | 1.5 | 1.5 | 1.5 | 0.8 | 1.5 | 1.5 | 1.5 | 1.5 | 2.5 | 2.5 |
| MFT (°C) | <6 | <6 | 7 | <6 | 5 | <6 | 11 | <6 | <6 | <6 | <6 | <6 |
| Gloss (M/S) | 73/74 | 70/72 | 70/70 | 72/72 | 71/71 | 61/62 | 70/71 | 67/70 | 64/70 | — | 71/73 | 73/74 |
| Elongation at break (%) | 312 | 268 | 278 | 236 | 189 | 246 | 186 | 232 | 216 | 221 | 378 | 408 |

TABLE 3-continued

| Initially taken mixture | D8 | D9 | D10 | D11 | D12 | D13 | D14 | D15 | D16 | D17 | D18 | D19 |
|---|---|---|---|---|---|---|---|---|---|---|---|---|
| Blocking resistance | | | | | | | | | | | | |
| 1 h | 0 | 0 | 0 | 0 | 0 | 0 | 0 | 1 | 1 | 0 | 0 | 0 |
| 24 h | 0 | 0 | 0 | 0 | 0 | 0 | 0 | 1 | 0.5 | 0 | 0 | 0 |
| Wet adhesion | 1 | 2 | 4 | 3 | 4 | 3 | 1 | 4 | 4 | 3 | 3 | 4 |

We claim:

1. An aqueous polymer emulsion obtained by polymerizing in a first polymerization stage monomers 1 having at least one ethylenically unsaturated group by free radical aqueous emulsion polymerization to a conversion of at least 90% by weight, based on the monomers 1 to be polymerized, and then polymerizing, in the presence of the product mixture of the first polymerization stage, monomers 2 having at least one ethylenically unsaturated group in a second free radical aqueous emulsion polymerization stage, with the proviso that a) the monomers 1 are such that their random copolymerization alone would give a polymer 1 whose glass transition temperature tends to the limit $Tg^1$ with increasing molecular weight, b) the monomers 2 are such that their random copolymerization alone would give a polymer 2 whose glass transition temperature tends to the limit $Tg^2$ with increasing molecular weight, c) the difference between $Tg^1$ and $Tg^2$ is at least 20° C., d) in addition to the monomers of the monomers 1 and 2, at least one adhesion-promoting monomer which differs from these monomers 1 and 2 and contains at least one ethylenically unsaturated group and at least one amino, ureido or N-heterocyclic group is polymerized in an amount of from 0.1 to 10% by weight, based on the total amount of the monomers to be polymerized, e) from 20 to 100 mol % of the total amount of the adhesion-promoting monomers to be polymerized according to d) are polymerized in the first polymerization stage and f) the amount of the monomers of the polymer having the lower limit $Tg^1$ is from 40 to 90% by weight, based on the total amount of the monomers 1 and 2.

2. An aqueous polymer emulsion as claimed in claim 1, wherein the polymerization conversion of the first polymerization stage is at least 95% by weight, based on the monomers 1 to be polymerized.

3. An aqueous polymer emulsion as claimed in claim 1, wherein the polymerization conversion of the first polymerization stage is at least 98% by weight, based on the monomers 1 to be polymerized.

4. An aqueous polymer emulsion as claimed in claim 1, wherein the amount of the monomers of the polymer having the lower limit $Tg^i$ is from 60 to 80% by weight, based on the total amount of the monomers 1 and 2.

5. An aqueous polymer emulsion as claimed in claim 1, wherein the amount of the monomers of the polymer having the lower limit $Tg^i$ is from 70 to 80% by weight, based on the total amount of the monomers 1 and 2.

6. An aqueous polymer emulsion as claimed in claim 1, wherein the difference between $Tg^1$ and $Tg^2$ is from 20° to 150° C.

7. An aqueous polymer emulsion as claimed in claim 1, wherein the difference between $Tg^1$ and $Tg^2$ is from 60° to 120° C.

8. An aqueous polymer emulsion as claimed in claim 1, wherein the lower of the two limits $Tg^i$ is from −60° to +35° C.

9. An aqueous polymer emulsion as claimed in claim 1, wherein the lower of the two limits $Tg^i$ is from −30° to +35° C.

10. An aqueous polymer emulsion as claimed in claim 1, wherein the lower of the two limits $Tg^i$ is from −20° to +20° C.

11. An aqueous-polymer emulsion as claimed in claim 1, wherein the higher of the two limits $Tg^i$ is from >50° to 130° C.

12. An aqueous polymer emulsion as claimed in claim 1, wherein the higher of the two limits $Tg^i$ is from 60° to 120° C.

13. An aqueous polymer emulsion as claimed in claim 1, wherein the higher of the two limits $Tg^i$ is from 95° to 115° C.

14. An aqueous polymer emulsion as claimed in claim 1, wherein the polymerization stage 1 is of monomers resulting in a polymer having the lower limit Tg.

15. An aqueous polymer emulsion as claimed in claim 1, wherein the monomers 1 and 2 are selected from the group consisting of n-butyl acrylate, 2-ethylhexyl acrylate, ethyl acrylate, methyl methacrylate, n-butyl methacrylate, styrene, acrylonitrile, acrylic acid, methacrylic acid, acrylamide, methacrylamide, hydroxyethyl acrylate, hydroxyethyl methacrylate, n- hydroxypropyl acrylate, n-hydroxypropyl methacrylate, acrylamidopropanesulfonic acid, vinylsulfonic acid and the alkali metal salts thereof.

16. An aqueous polymer emulsion as claimed in claim 1, wherein the monomers 1 and 2 are selected from the group consisting of n-butyl acrylate, n-butyl methacrylate, 2-ethylhexyl acrylate, methyl methacrylate, acrylic acid, methacrylic acid, acrylamide and methacrylamide.

17. An aqueous polymer emulsion as claimed in claim 1, wherein the monomers having the lower $Tg^i$ value comprises from 10 to 50% by weight, based on the monomers whose homopolymers have Tg values above the lower $Tg^i$ and the monomers of the polymer having the higher $Tg^i$ value simultaneously comprises from 0 to 25% by weight, based on the monomers whose homopolymers have Tg values below the higher $Tg^i$.

18. An aqueous polymer emulsion as claimed in claim 1, whose minimum film formation temperature without the addition of film formation assistants is ≦30° C.

19. An aqueous polymer emulsion as claimed in claim 1, which contains ethyleneureaethyl methacrylate or N-(methacrylamidoethyl)ethyleneurea as the adhesion-promoting monomer.

20. An aqueous polymer emulsion as claimed in claim 1, wherein from 30 to 100 mol % of the adhesion-promoting monomers are polymerized in polymerization stage 1.

21. An aqueous polymer emulsion as claimed in claim 1, wherein from 40 to 100 mol % of the adhesion-promoting monomers are polymerized in polymerization stage 1.

22. An aqueous polymer emulsion as claimed in claim 1, wherein from 50 to 100 mol % of the adhesion-promoting monomers are polymerized in polymerization stage 1.

23. An aqueous polymer emulsion as claimed in claim 1, wherein from 40 to 60 mol % of the adhesion-promoting monomers are polymerized in polymerization stage 1.

24. An aqueous polymer emulsion as claimed in claim 1, whose solids content is ≧40% by volume.

25. An aqueous polymer emulsion as claimed in claim 1, whose solids content is ≧50% by volume.

26. An aqueous polymer emulsion as claimed in claim 1, whose solids content is from 40 to 70% by volume.

27. An aqueous polymer emulsion as claimed in claim 1, whose weight average diameter of the disperse polymer particles is from 40 to 300 nm.

28. An aqueous polymer emulsion as claimed in claim 1, whose weight average diameter of the disperse polymer particles is from 50 to 150 nm.

29. An aqueous polymer emulsion as claimed in claim 1, whose weight average diameter of the disperse polymer particles is from 50 to 100 nm.

30. An aqueous polymer emulsion as claimed in claim 1, whose nonuniformity of the polymer particle diameter distribution is from 1 to 5.

31. An aqueous polymer emulsion as claimed in claim 1, whose nonuniformity of the polymer particle diameter distribution is from 1 to 2.

32. An aqueous polymer emulsion as claimed in claim 1, wherein the polymerization temperature in both polymerization stages is from 60° to 90° C.

33. An aqueous polymer emulsion as claimed in claim 1, wherein the pH of the aqueous dispersing medium is buffered to a value of from 3 to 6 over the entire duration of the free radical aqueous emulsion polymerization.

34. An aqueous polymer emulsion as claimed in claim 1, which additionally contains at least one compound having at least two unprotected and/or reversibly protected aldehyde groups.

35. An aqueous polymer emulsion as claimed in claim 1, which contains glyoxal or glutardialdehyde as the polyaldehydic compound.

36. A polymer which is contained in a polymer emulsion as claimed in claim 1.

37. A method of adhering, coating or impregnating a material, comprising applying to the material an aqueous polymer emulsion as claimed in claim 1.

38. An aqueous color formulation containing an aqueous polymer emulsion as claimed in claim 1 as a binder.

39. An aqueous coating, impregnating or adhesive formulation, containing an aqueous polymer emulsion as claimed in claim 1 as a binder.

40. A substrate which is coated, impregnated or adhesively bonded with an aqueous formulation which contains an aqueous polymer emulsion as claimed in claim 1.

41. A process for the preparation of an aqueous polymer emulsion according to claim 1, comprising polymerizing in a first polymerization stage monomers 1 having at least one ethylenically unsaturated group by free radical aqueous emulsion polymerization to a conversion of at least 90% by weight, based on the monomers 1 to be polymerized in the first polymerization stage and monomers 2 having at least one ethylenically unsaturated group is then polymerized in the presence of the product mixture of the first polymerization stage by free radical aqueous emulsion polymerization in a second polymerization stage, wherein a) the monomers 1 are such that their random copolymerization alone would give a polymer 1 whose glass transition temperature tends to the limit $Tg^1$ with increasing molecular weight, b) the monomers 2 are such that their random copolymerization alone would give a polymer 2 whose glass transition temperature tends to the limit $Tg^2$ with increasing molecular weight, c) the difference between $Tg^1$ and $Tg^2$ is at least 20° C., d) in addition to the monomers of the monomers 1 and 2, at least one adhesion-promoting monomer which differs from these monomers and contains at least one ethylenically unsaturated group and at least one amino, ureido or N-heterocyclic group is polymerized in an amount of from 0.1 to 10% by weight, based on the total amount of the monomers to be polymerized, e) from 20 to 100 mol % of the total amount of the adhesion promoting monomers to be polymerized according to d) are polymerized in the first polymerization stage and f) the amount of the monomers of the polymer having the lower limit $Tg^1$ is from 40 to 90% by weight, based on the total amount of the monomers 1 and 2.

42. An aqueous polymer emulsion as claimed in claim 1, whose minimum film formation temperature without the addition of film formation assistants is ≦10° C.

43. An aqueous polymer emulsion as claimed in claim 1, wherein both the monomers 1 and the monomers 2 are metered continuously into the polymerization vessel in the course of the polymerization stages 1 and 2 as a corresponding monomer mixture which may be preemulsified in an aqueous medium, and the adhesion-promoting monomers which are to be polymerized in the particular polymerization stage are fed to the polymerization vessel after being mixed in the corresponding monomer mixture 1 and 2.

44. An aqueous polymer emulsion as claimed in claim 43, wherein the continuous monomer feed is carried out in such a way that the polymerization conversion of the monomers already added to the polymerization vessel is ≧90% by weight at any time after the beginning of the polymerization.

45. An aqueous polymer emulsion as claimed in claim 43, wherein the continuous monomer feed is carried out in such a way that the polymerization conversion of the monomers already added to the polymerization vessel is ≦95% by weight at any time after the beginning of the polymerization.

46. An aqueous polymer emulsion as claimed in claim 43, wherein the continuous monomer feed is carried out in such a way that the polymerization conversion of the monomers already added to the polymerization vessel is ≦98% by weight at any time after the beginning of the polymerization.

* * * * *

UNITED STATES PATENT AND TRADEMARK OFFICE
CERTIFICATE OF CORRECTION

PATENT NO. : 5,744,540
DATED     : April 28, 1998
INVENTOR(S): Roland BAUMSTARK, et al.

It is certified that error appears in the above-identified patent and that said Letters Patent is hereby corrected as shown below:

On the title page, Item [30] Foreign Application Priority data is missing. It should read:

--Nov. 4, 1994  [DE]  Germany................ P44 39 459.4--

Signed and Sealed this

Tenth Day of November 1998

Attest:

BRUCE LEHMAN

Attesting Officer

Commissioner of Patents and Trademarks